3,810,783
REMOISTENABLE, PREPASTED WALL COVERING
AND METHOD OF MAKING
William A. Bomball, Decatur, Ill., assignor to A. E.
Staley Manufacturing Company, Decatur, Ill.
No Drawing. Filed May 5, 1972, Ser. No. 250,772
Int. Cl. C09j 7/02
U.S. Cl. 117—122 S                                    9 Claims

ABSTRACT OF THE DISCLOSURE

A starch-based remoistenable prepasted wallcovering adhesive comprising starch, methyl ether of cellulose, coating clay, hydrolyzed polyvinyl alcohol, monobasic sodium phosphate, wax, small amounts of a suitable fungicide, and a crosslinking agent such as glyoxal. Optionally, polyvinyl acetate can be added to increase adhesive strength when needed. This adhesive compound is easily adapted to rapid aqueous coating procedures for application to the reverse side of wallcoverings, such as cloth-backed vinyl material, and the adhesive coating so obtained has excellent resistance to adhesive loss during the long soaking of the coated wallcovering stock in either high or low hardness water. In addition, the wallcovering remains slippable while wet for an adequate length of time to allow positioning on the wall, and it can easily be stripped from the wall without the application of steam, or the need for other time consuming stripping methods. Traditional wallcoverings such as wallpapers, and many more recently developed wallcoverings can be used in combination with the remoistenable adhesive of this invention to take full advantage of the convenient application technique made possible. "Wall" as used here includes any substrate surface which is to be covered, including billboards, ceilings, cabinets, and chests.

BACKGROUND OF THE INVENTION

Sky-rocketing costs for semi-skilled laborers have substantially increased the popularity of "do-it-yourself" products, such as decorative prepasted wallcoverings. Such products enable homemakers to do their own interior decorating at substantially less cost than would otherwise be the case. Most "do-it-yourselfers" will not tackle a job such as wallpapering unless the pasting step is simplified. Therefore, the marketing potential is good for a prepasted wallcovering which can be successfully applied by amateurs who do not have the usual skills or dexterity generally required for conventional wallpapering methods, in which the adhesive is mixed and applied at the job site. Proper pasting techniques become even more critical when the heavier vinyl-cloth wallcovering materials are used.

One of the most necessary properties of wallcovering adhesive for this amateur decorator market is that the wallcovering be capable of retaining its adhesive capacity and strippability even after a long "soak-time," so typically needed by the inexperienced home decorator who has tackled a wallcovering job for the first time. Such amateur operators tend to make up in enthusiasm what they lack in skill, and get the covering material soaked before they know just exactly where to place it on the wall. Frequent interruptions by phone, friends or family members (including pets) also present a sizable problem. To satisfy the "do-it-yourself" market, it is necessary that the adhesive employed be resistant to prolonged "soak" times, even in hard waters typically used to wet the prepasted wallcovering at the time of application.

A second requirement for a prepasted wallcovering adhesive is "slip." After the covering material has been placed on the wall, it is necessary that it be properly aligned. "Slip" is the property which enables one to slide the wallcovering into correct position on the wall.

A third requirement, which is an important aid to acceptance of any wallcovering material, is the relative ease of its removal. Home decorators frequently choose paint instead of wallpaper in their decorating projects because of their vivid memories of their unpleasant personal experience in removing wallcoverings which had been applied with conventional adhesives. "Strippability," when the wallpaper is due for replacement, is therefore of substantial importance to obtain acceptance of prepasted wallcovering products. The added built-in convenience made possible by prepasted wallcoverings have good "slip," and resistance to long soak times tend to make wallcovering more appealing than painting because of the wide variety of flocked, embossed, patterned and beautifully color-printed designs available to the potential home decorator.

A practical consideration for any remoistenable adhesive to be used for this application is that it be low in cost. It is also important in the over-all cost of the prepasted wallcovering that the manufacturer be able to apply the adhesive in a single-step operation using conventional coating equipment, either before or after printing the wallcovering design. Prior coating methods required two steps, and were further necessarily performed *after* printing, because of excessive dusting.

Until now, the commercially available adhesives for prepasted wallcovering materials have required a two-step application technique, and frequently, they could not be coated uniformly on the wallcovering material. A non-uniform coat on the wallcovering stock contributes to excessive dusting after the adhesive has been applied, and makes it difficult to print the decorative designs on the stock after application of the adhesive. In addition, in efforts to obtain the desired adhesive properties with long soak time, commercially available remoistenable wallcovering adhesives fell short of the desired strippability. Existing coating equipment operates at temperatures above 180° F., and any new aqueous adhesive mix must fit this application temperature requirement.

The copending application of Thomas G. Swift, Ser. No. 90,862, filed Nov. 18, 1970, and now U.S. Pat. No. 3,690,938, is directed to a novel remoistenable adhesive which has the general goals required, but utilizes more expensive ingredients than would ordinarily be acceptable for prepasted wallpaper. The present invention is an improvement over the Swift adhesive, especially in the area of "soak-time" and strippability.

DESCRIPTION OF THE PRIOR ART

A remoistenable pregummed product is described in U.S. Pat. No. 3,640,756, issed Feb. 8, 1972 to Beersma et al. In this disclosure, a cross-linked starch phosphate derivative is applied dry to a wallpaper surface which has been coated with sodium carboxymethylcelluose, cellulose acetate, ethyl cellulose, or polyvinyl alcohol. A granular starch carboxy methylether is also disclosed here, and is dusted onto the wallpaper surface which has been coated with polyvinyl alcohol. A group of cross-linking agents are mentioned, but none of these is singled out as preferred, other than by the fact that only epichlorohydrin and urea are used in the detailed examples of the invention.

Beersma et al. make quite a point of teaching that the granular structure of their cold-water swelling starch derivatives is to be preserved, even through the application step onto the wallpaper. Only hydrophilic substituents are added to the starch molecules, and there is no discussion of strippability or prolonged soak times. The main point of this patent appears to be the use of a cold water swelling, cross-linked starch derivative in granular form as part of a remoistenable adhesive.

Canadian Pat. 881,574 is directed to a wallpaper adhesive, and suggests the use of starches. However, this reference discourages the use of starches because of enzymes which cause degradation of the starch, and the detailed examples of the patent described *only* the use of non-starch materials, such as hydroxypropyl methyl cellulos, as the main adhesive ingredient. The range of hydrophobic materials is from 20–80%, whereas applicant's ranges from 5–15% by weight. Again, this patent does not distinguish between different cross-linking agents used, and states that these are used with cellulose derivatives, and there is no disclosure here of the higher temperatures required for automated coating processes.

This Canadian Pat. 881,574 makes no mention of remoistening, and apparently the patentee only contemplates a single application step at the time of applying the wallpaper to the wall, in the same manner that a conventional wallpaper paste is mixed and applied. This adhesive is described either as a dry mix or as a liquid adhesive, and it is applied to the wallcovering *at the time* the wallcovering is applied to a wall.

The references gave no consideration to "soak time," nor do they contemplate the use of a monosodium phosphate buffering agent to keep the pH of the adhesive constant during the remoistening procedure, just prior to application to the wall. The use of this buffer is particularly important when "hard" water is used for the remoistening step, because the glyoxal crosslinking is extremely sensitive to pH conditions. The pH of the remoistened adhesive should be in the range of 3.5 to 5.5 to avoid "unzipping" of the glyoxal cross-links, and consequent collapse of the adhesive's bonding strength.

SUMMARY OF THE INVENTION

This invention is directed to a remoistenable adhesive composition which is particularly useful for the manufacture of prepasted wallcoverings including decorative wallpapers. This adhesive can be applied to the wallcovering stock material in a one-step operation either before or after the printing step. The prepasted wallcovering coated with this adhesive has good "slip" properties so that it can be slid into correct position when the wallcovering is remoistened and applied to an undersurface or substrate such as wallboard, plaster or wood.

Instead of utilizing an adhesive composition including a modified waxy maize starch such as with the Swift application, Ser. No. 90,862, mentioned above, this adhesive composition utilizes an oxidized yellow dent corn starch in combination with methyl ether cellulose, predispersed coating clay, hydrolyzed polyvinyl alcohol, monobasic sodium phosphate, paraffin wax, a sodium salt of sulfonated paraffin wax, glyoxal, and a fungicide.

The yellow dent corn starch is oxidized to an extent which provides the correct viscosity range useful for papercoating equipment. At present, a carboxyl range of .4%–.8% by weight is preferred. The methyl ether of cellulose functions as a "slip" agent, and the predispersed coating clay is a conventional extender. Polyvinyl alcohol is a well-known plasticizer, and improves the soak time by crosslinking with glyoxal to some extent. The paraffin wax and sodium salt of sulfonated paraffin wax serve the special function of providing a good resistance to soaking after the prepasted wallcovering has been remoistened just prior to placing it on a wall, and these ingredients are excellent additions for improving the strippability of old wallcoverings, once applied.

This adhesive composition differs in several ways from the prior art remoistenable adhesives, including the adhesive disclosed in the Swift application mentioned above. Oxidized yellow dent corn starch can now be used as a *major* adhesive ingredient, and the percent by weight of clay can actually exceed the weight of the modified corn starch present in the formulation. This advantage provides a significant improvement in economy over the Swift adhesive discussed above.

In addition, this adhesive composition utilizes polyvinyl alcohol and glyoxal in a combination which gives improved soak times far in excess of the performance possible with prior art remoistenable adhesives. This formulation provides an adhesive which has excellent resistance to adhesive loss during prolonged soaking upon remoistening for installation in either a high or a low hardness water, and it remains slippable while wet for an adequate length of time to allow accurate positioning of the wallpaper on the wall. Once dry, the wallcovering may be easily stripped from the wall without the application of steam or other time-consuming and tedious methods of stripping.

The extent of oxidation of the corn starch is carefully controlled to obtain the desired viscosity, which should be in the range of 1,200 to 2,000 centipoise Brookfield [(30% solid) 155° F., 20 r.p.m., No. 3 spindle]. Various types of starches can be used, especially those which show a low tendency to crystallize during aging of the adhesive film. It is also contemplated that synthetic or natural products which are cold-water remoistenable may be substituted for the starch component of the adhesive. When yellow dent corn starch is used, the desired degree of carboxyl substitution is from .4 percent to .8 percent based on the dry weight of the starch.

In addition to the methyl ether of cellulose other cellulosic materials can be used as a "slip agent" to aid in sliding the covering into place on the surface being covered. Hydroxyethyl cellulose, hydroxypropyl cellulose, carboxymethyl cellulose and hydroxypropyl methyl cellulose can be used for this purpose with minor adjustments in the formulation. When the preferred combination of ingredients is used, the remoistened wallcovering can be adjusted in position on wallboard up to ten minutes after application.

The clay filler presently in use is a number 2 coating clay, but it is contemplated that other fillers can be used. The primary requirement is that the filler be compatible with the other ingredients in the adhesive mixture, and that it be capable of application to wallcovering back surface in a one-step coating technique. The clay filler also contributes to improved strippability, in cooperation with the paraffin wax and the sodium salt of sulfonated paraffin.

In the typical commercial enterprise, a premix formula containing all of the adhesive ingredients, except glyoxal and water, and in some instances, polyvinyl acetate, is supplied by the adhesive manufacturer to the wallcovering manufacturer who does the coating according to applicant's method. An adhesive solution containing about 20–30 percent solids on the dry adhesive is made up and cooked at 185–205° F. for 15–30 minutes. To this is added about 1.25 percent by weight of a 40% aqueous solution of glyoxal at a temperature ranging from 185° F. to 205° F. to induce the desired cross-linking effect. This is done at a pH of about 3.5 to 5.5, buffered as necessary to control pH and the mixed dispersion is cooked for an additional 15–30 minutes at 185°–205° F. The adhesive is then applied to the backsurface of the wallcovering at a temperature of about 110° F. to 205° F. and dried. The preferred temperature range for application of the adhesive is 125°–150° F., and drying may be at any temperature up to about 300° F.

The adhesive of this invention is easy to apply, stays flexible, and does not "dust" during later embossing and printing operations. The prepasted wallcoverings using this remoistenable adhesive can be subjected to long soak times (up to about fifteen minutes) at the time of use, and the adhesive permits "slipping" of the wallcovering to adjust its position for up to ten minutes after application. It can be used to adhere to many base materials, including sized or unsized plasterboard, latex painted wallboard, and primed or enameld surfaces. The rewetting characteristics remain the same, even after several months of storage.

DETAILED DESCRIPTION

The following detailed description of specific examples of the invention are intended to illustrate more fully the various features of the invention, but are not intended to limit its applications.

EXAMPLE I

In general, the prepasted, remoistenable wallcovering of the invention is made as follows. The below listed ingredients are first dry-blended together:

(A) Dry pre-mix blend

| | Parts |
|---|---|
| Oxidized corn starch | 30 |
| 4,000 cps. methyl ether of cellulose | 6.4 |
| HT Predispersed #2 Coating Clay | 34 |
| Fully hydrolyzed polyvinyl alcohol | 8.5 |
| Sodium phosphate, monobasic | 8.5 |
| Paraffin wax | 6.4 |
| Sodium salt of sulfonated paraffin wax | 6.4 |
| Sodium salt of O-phenylphenol, tetrahydrate (fungicide) | 0.2 |

The paraffin wax and sodium salt of paraffin wax are melted together, and then hot sprayed into the other dry ingrediennts to obtain a uniform blend of the wax materials.

(B) Mixing and application procedure

The above dry ingredients are mixed with 233 parts water for 30 minutes at room temperature. The mixture is then heated to 190–205° F. for about 15 to 20 minutes. Then 0.47 part of active glyoxal are added, and cooking of the mixture is continued for about 15–30 minutes at above 190° F. The mixture is then cooled quickly to 140–150° F. and the wallcovering stock is coated so that dry coat weight is 7–20 pounds/3,000 ft.² (ream). The coated wallcovering stock is then cured for 1–2 minutes in warm forced air at 185–220° F. Even better results are possible when the water is preheated to above 185° F. and the dry adhesive premix blend added. The higher temperature insures that the methyl ether of cellulose will not dissolve to any appreciable extent.

All of the ingredients listed above, except for glyoxal, can be mixed together in a dry premix (without water), and delivered to the paper coating factory in dry form. The water and glyoxal can be added there, and the other steps followed in the same sequence as set forth above in Part B of Example I.

EXAMPLE II

The procedure for making the dry premix is generally as follows:

(1) The oxidized corn starch, methylether of cellulose, clay, fine ground monobasic sodium phosphate the polyvinyl alcohol and fungicide are blended together;

(2) The sodium salt of sulfonated paraffin wax and the paraffin wax are melted at 180° F. and hot sprayed into the dry blend of the other ingredients listed above;

(3) The blend is screened through a No. 4 mesh and packaged for shipment as a free-flowing, dry premix blend for the adhesive.

When the premix is to be used, it is further processed as described above in Example I, Part B under "mixing and application procedure."

EXAMPLE III

Adhesive samples made according to Example I were tested with the following typical results:

| | Typical value |
|---|---|
| Moisture [1] | 2–6% |
| Percent hexane solubility [2] | 8.5–10.5% |
| Percent ash [3] | 39.5% |
| Percent phosphorus [4] | 1.2–2.5% |
| Brookfield viscosity after cooking [5]: | |
| @ 150° F.: 1,500–2,000 cps. | |
| @ 77° F.: 7,000–12,000 cps. | |
| pH (on viscosity cook) [6]: 4.5–5.5. | |

[1] Moisture content was determined using an Infrared Moisture Balance (Available from Central Scientific Co., Catalog No. 26680). The equipment must be adjusted to insure that only moisture is evaporated during the heating cycle. About ten minutes of heating is considered sufficient for testing starch based materials.
[2] Hexane solubility is determined following the Standard Analytical Methods of C.I.R.F., 2d Edition, Method G–10. Oil is extracted with pretroleum ether from a sample at, or lower than, equilibrium moisture.
[3] Ash determination follows Standard Analytical Method of C.I.R.F., 2d edition. Method B–8.
[4] Phosphorus content is determined using the perchloric-periodic acid "liquid fire" method. Phosphorus is specifically determined as the molybdenum blue complex by measuring the adsorbance of the solution at 800 millimicron. Additional description appears in the following references: Allen, R. J. L., Biochem. J., 34, 860 (1940); and Smith et al., Talanta, 4 184–193 (1960).
[5] Brookfield viscosity is measured on a 30% "as is" dispersion after 30 minutes cooking at above 190° F. The adhesive is cooled to 150° F. and the viscosity is measured. An RVT Brookfield viscosimeter is used, at 20 r.p.m. using a No. 3 spindle.
[6] pH is measured using an electrometer having a regular glass electrode capable of measuring pH values in the range from 1 to 10. The machine is checked out or calibrated against two standards at pH 4 and pH 7 according to the instructions supplied with the equipment.

The cooked adhesive may be applied to the back surface of a wallcovering stock material by any of the well known methods, including application with an air knife coater, or with a roll coater. If necessary, solids content can be lowered to attain a lower coating viscosity. A dry coat weight of 6–10 lbs./3000 sq. ft. of wallcovering is recommended.

The drying (cure) procedure followed will have a direct effect on the possible soak times for the remoistened wallcovering at the time of application to a wall or other surface. If the coated wallcovering is dried at 110° F. for ten minutes, the wallcovering may be soaked in water for remoistening for a period from 2–10 minutes without excessive adhesive loss. If a longer "soak-time" is desired, then a higher drying temperature should be used, with a shorter drying time.

Coating at above 110° F. is important to obtain a uniformly coated product. At lower temperatures, an irregular coating results. This phenomena can be explained in part by the behavior of methyl cellulose, which has a reverse solubility curve, and is more soluble in cold water than in hot. If the coating is applied at room temperature, most of the methyl ether of cellulose goes into solution, and tends to cause uneven coating.

The glyoxal level is also important, and it tends to react faster at higher temperatures, so that less time is needed for the crosslinking step if the higher end of the cooking temperature range is employed. The actual quantity of glyoxal present determines the extent of crosslinking, and a larger amount of glyoxal increases the soak time possible by retarding the solubility of the adhesive. One particularly important advantage flowing from the use of glyoxal is that the degree of crosslinking is always directly related to the amount used, all other conditions being the same. The crosslinking reaction goes to completion with no residues or by-products to effect the properties or the predictability of the soak time to be attained with a specified amount of crosslinker (glyoxal).

EXAMPLE IV

The same ingredients are used as set forth in Examples I and II above, and one additional ingredient is added after cooking with the glyoxal. Polyvinyl acetate has been found to be helpful to increase the adhesion level in easily regulated increments. The presently preferred amount of polyvinyl acetate (50% dry solids) to be added ranges from 1 to 20% by weight of the total weight of the adhesive. The adhesion level appears to increase in direct proportion to an increase in the amount of polyvinyl acetate added within the above range.

EXAMPLE V

Samples of wallcovering materials coated with the remoistenable adhesive are tested as generally set forth below. Two hundred thirty three grams of water and 100 grams of the adhesive premix described in Example I are mixed and cooked at 185–205° F., with stirring in a stainless steel beaker. After 20–30 minutes, .3% to 5% by weight (based on the total weight of the aqueous adhesive mixture) of aqueous glyoxal containing about 40% active glyoxal is added, and cooking is continued for about 20–30 minutes at a temperature of about 185°–205° F. The adhesive mixture is then cooled to about 150° F. and the back surface of a 55 lb. latex impregnated, strippable hanging stock is coated, using a No. 20 wire wrapped rod. The coated sheet is dried in a forced air oven at 110°–300° F. for about 2–10 minutes.

EXAMPLE VI

Test specimens measuring 2" x 4" were cut from the dry, hanging stock coated with the adhesive of Examples I and II, according to the method of Example V, and these were checked for average dry coat weight. These test samples were individually soaked in room temperature tap water for times ranging from .5–15 minutes as shown in Table I. The remoistened samples were then applied to sized wallboard, and "slippability" was observed immediately, and after the time periods recorded in Table I. After drying overnight, the test samples were stripped from the wallboard and the ease or difficulty of stripping was recorded.

Typical observations of test samples made generally according to the above procedure are as follows:

TABLE I

| Sample | Soak time, minutes | Slip Initial | Slip 5 minutes | Slip 10 minutes | Strippability |
|---|---|---|---|---|---|
| A | 0.5 | Excellent | Excellent | Good-excellent | Excellent. |
|  | 1.0 | ...do | ...do | Excellent | Do. |
|  | 2.0 | ...do | ...do | ...do | Do. |
|  | 5.0 | ...do | ...do | ...do | Do. |
|  | 10.0 | ...do | ...do | ...do | Do. |
|  | 15.0 | ...do | ...do | Good-excellent | Do. |

EXAMPLE VII

The following test was used to generate data on force required to strip wallcovering samples coated with the adhesive of Example IV from a painted surface:

A 6" wide by 10" long specimen was soaked in room temperature tap water, then bonded to an interior latex paint coated plasterboard test panel. The wallcovering was smoothed with a paperhanger's brush to remove wrinkles and to remove air entrapped between the two bonded surfaces. After allowing the adhesive to dry for at least 16 hours, the 6" wide edge was peeled back about 1–2 inches, and a paper clamp was attached to the specimen. An OHAUS (Model 8004) spring scale was hooked onto the clamp, and the specimen was pulled, perpendicular to the covered surface. When the specimen started to strip, the average scale reading required to maintain a slow continuous stripping was observed and recorded.

Typical observations of test samples made according to this procedure were as follows:

TABLE II

| Sample | Soak time, minutes | Initial | Force required to strip, grams/6" specimen |
|---|---|---|---|
| A (Example V adhesive) | 0.75 | Excellent | 800–900 |
| A¹ (+2.27% PVAc) | 0.75 | ...do | 1,300 |
| A² (+5.5% PVAc) | 0.75 | ...do | 1,700 |
| A³ (+8.25% PVAc) | 0.75 | ...do | 2,000 |

Sample A, made according to the procedure of Example V was used as a basis for comparison to Samples A¹, A², and A³, which were coated with the adhesive described in Example IV, the amount of added polyvinyl acetate having been changed as indicated in Table II. The results were observed and recorded, slip being a visual observation, generally rated excellent in all four samples. "Strip" was observed as recorded, using the scale linkage described above. It can be seen that the amount of polyvinyl acetate used varies directly in proportion to the amount of force required to strip the wallcovering after 16 hours. It has been observed that further increases in the amount of polyvinyl acetate can increase the stripping force required to levels which exceed those desired for good strippability. The polyvinyl acetate does provide a good secondary means of balancing strippability vs. adherence levels for the wallcoverings of the invention.

The above tests demonstrate that applicant has developed a prepasted wallcovering having excellent "soak time" stability upon remoistening, good slip properties, and excellent and easily adjusted strippability to facilitate removal of the wall covering at a future date. Ordinary tap water can be used to remoisten the wallcovering at the time of application, even though a pH sensitive cross-linking agent (glyoxal), is used, when an effective buffering agent, monobasic sodium phosphate, is included in the adhesive formula mixture. Prior to the addition of this buffering agent to the formula, the glyoxal tended to de-crosslink under alkaline (hard water) conditions. The buffering agent effectively eliminates this problem by keeping the pH of the adhesive mixture in a pH range from about 3.5 to 5.5.

Many other adhesives had been tried before the combination of the invention was developed. For example, adhesives based on acid hydrolyzed hydroxyethyl starches, and another based on acid hydrolyzed carboxymethyl waxy maize starch were tried with only moderate success. In some instances, the soak-time upon remoistening could not be extended appreciably beyond 3–4 minutes. In several samples, where no wax was used, little or no strippability could be obtained. In at least one instance, the adhesive exhibited poor-swelling properties, and the wallcovering could not be easily "slipped" on the wall surface.

These specifically formulated adhesives, when applied to a wallcovering material according to the method here disclosed, provide a remoistenable prepasted wallcovering which can be soaked in ordinary tap water for remoistening for up to twenty minutes without loss of adhesive strength. Once applied to a subsurface, the covering can be shifted in position for up to ten minutes after application without wrinkling, tearing, or other distortion. There is a sufficient level of wax in the formulation to allow easy stripping of the wallcovering from the substrate whenever desired after initial application, and the addition of polyvinyl acetate can be made to adjust the ease of strippability to a higher force level requirement.

Since many embodiments of this invention may be made and since many changes may be made in the embodiments described, the foregoing is interpreted as illustrative and the invention is defined by the claims appended hereafter.

I claim:

1. A remoistenable, prepasted wallcovering capable of withstanding soaking in water for up to 20 minutes without significant loss of adhesive strength, said wallcovering being slippable on a substrate surface for up to 10 minutes after application and being strippable from said substrate surface after application, the adhesive comprising in combination, about 20%–40% by weight oxidized starch having a carboxyl content from .4% to .8% based on the weight of the starch, about 3–10% methyl ether of cellulose, about 20–40% predispersed number two coating clay, about 5–10% hydrolyzed polyvinyl alcohol, about 5–15% monobasic sodium phosphate, about 5–15% of a mixture of a sodium salt of sulfonated paraffin wax and paraffin wax, and about .3% to 5% by weight based on the total weight of said aqueous adhesive mixture of aqueous glyoxal containing about 40% active glyoxal, said glyoxal serving to effectively retard solubility of said adhesive mixture when the prepasted wallcovering is remoistened for installation on a substrate surface.

2. The prepasted wallcovering of claim 1, in which the adhesive includes about 0.20% of a fungicide to impart mildew resistance after installation.

3. The prepasted wallcovering of claim 1, in which the adhesive mixture has been applied to the back surface of the wallcovering at a temperature of at least about 150° F., whereby the methyl ethyl of cellulose remains substantially undissolved during the coating of the back surface of said wallcovering to retain a lower viscosity adhesive mixture to facilitate a continuous coating operation using automatic coating apparatus.

4. The prepasted wallcovering of claim 1, said adhesive having a pH of 3.5–5.5 when remoistened.

5. The prepasted wallcovering of claim 1, including about 1–20% polyvinyl acetate to further increase the adhesive properties of the wallcovering to a substrate surface even after extended soak times incident to remoistening.

6. The method of making a remoistenable adhesive, prepasted wallcovering material, the steps comprising:
 (1) Blending together the following ingredients
  (a) about 20–40 parts oxidized corn starch having a carboxyl content from 0.4% to 0.8%;
  (b) about 3–10 parts methyl ether of cellulose;
  (c) about 20–40 parts numbers 2 predispersed coating clay;
  (d) about 5–10 parts hydrolyzed polyvinyl alcohol; and
  (e) about 5–15 parts of a mixture of a sodium salt of sulfonated paraffin wax and paraffin wax;
 (2) Then dispersing the above blend in about 180–400 parts water and cooking for at least 15–30 minutes at a temperature of about 185°–205° F.;
 (3) Adding about .3% to 5% by weight based on the total weight of said aqueous adhesive mixture of aqueous glyoxal containing about 40% active glyoxal, said glyoxal serving to effectively retard solubility of said adhesive mixture when the prepasted wallcovering to which it is applied is remoistened in water for soak times up to 20 minutes at the time of installation on a substrate surface;
 (4) Then cooking the partially cooked blend for an additional 15–30 minutes at a temperature of about 185°–205° F.;
 (5) Cooling the adhesive mixture to a temperature of about 110° F. to 180° F.;
 (6) Applying the cooled adhesive mixture to the back surface of a wallcovering at a temperature in the range of 110°–180° F.; and
 (7) Drying the adhesive coated wallcovering at a temperature of about 110°–300° F.

7. The method of claim 6, in which the coating is dried for 10 minutes at about 110° F. to provide an adhesive coated wallcovering capable of withstanding up to a ten-minute soak time in water when remoistened for application to a substrate surface without significant loss of adhesive strength, and in which the pH of the remoistened adhesive is from 3.5 to 5.5.

8. The method of claim 6 in which the adhesive coating is dried for about 2½ minutes at a temperature of about 175° F. to provide an adhesive coated wallcovering capable of withstanding up to a twenty minute soak time when remoistened in water without significant loss of adhesive strength.

9. The method of claim 6 including the step of adding 1–20% by weight based on the total weight of the adhesive mixture of polyvinyl acetate after the cooking period, said polyvinyl acetate being added to increase the bonding strength of the adhesive mixture.

References Cited
UNITED STATES PATENTS

| | | | |
|---|---|---|---|
| 3,640,756 | 2/1972 | Beersma et al. | 117—84 |
| 2,808,380 | 10/1957 | Olsen et al. | 117—122 |
| 3,690,938 | 9/1972 | Swift | 117—122 |
| 2,992,129 | 11/1961 | Gauthier | 117—122 X |
| 3,661,895 | 5/1972 | Germino et al. | 117—139.5 X |

WILLIAM D. MARTIN, Primary Examiner

B. D. PIANALTO, Assistant Examiner

U.S. Cl. X.R.

117—68.5, 168